(12) United States Patent
Kim

(10) Patent No.: US 6,526,347 B2
(45) Date of Patent: Feb. 25, 2003

(54) CONTROL METHOD FOR DIESEL ENGINE

(75) Inventor: Young-Gab Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/747,708

(22) Filed: Dec. 22, 2000

(65) Prior Publication Data

US 2001/0005806 A1 Jun. 28, 2001

(30) Foreign Application Priority Data

Dec. 24, 1999 (KR) .............................................. 99-62083

(51) Int. Cl.⁷ ................................................. G06F 7/00
(52) U.S. Cl. ...................................... 701/104; 180/179
(58) Field of Search ................................. 701/103, 104, 701/110, 114, 115, 102; 180/179; 123/198 DB, 198 F, 350, 352

(56) References Cited

U.S. PATENT DOCUMENTS

| | | | | |
|---|---|---|---|---|
| 4,590,909 A | * | 5/1986 | Heintz | 123/360 |
| 5,177,682 A | * | 1/1993 | Oo et al. | 123/352 |
| 6,104,976 A | * | 8/2000 | Nakamura | 180/170 |
| 6,178,371 B1 | * | 1/2001 | Light et al. | 701/110 |
| 6,275,760 B1 | * | 8/2001 | Saito et al. | 477/901 |

FOREIGN PATENT DOCUMENTS

| | | | | |
|---|---|---|---|---|
| JP | 2001200740 | * | 7/2001 | F02D/29/02 |

* cited by examiner

Primary Examiner—Hieu T. Vo
(74) Attorney, Agent, or Firm—Christie, Parker & Hale, LLP

(57) ABSTRACT

A method for controlling a diesel engine, is provided where when a vehicle is traveling on a downgrade, an enable vehicle speed is set according to a calculated aiming error, and a vehicle speed limit is modified based on an accelerator pedal position and by an offset value that is set according to an enable error calculated based on the present vehicle speed limit, the present vehicle speed, and the enable vehicle speed.

11 Claims, 3 Drawing Sheets

CONTROL METHOD FOR DIESEL ENGINE

CROSS-REFERENCE TO RELATED APPLICATION

This application claims priority of Korea patent Application No. 99-62083, filed on Dec. 24, 1999.

BACKGROUND OF THE INVENTION (a) Field of the Invention

The present invention relates to a control method for a diesel engine, and more particularly, to a control method for a diesel engine in which a vehicle speed limit is increased after determining that the vehicle is travelling on a downgrade, thereby enabling the momentum of the downgrade to be used to propel the vehicle.

(b) Description of the Related Art

The main structural elements of a diesel engine for converting heat energy into mechanical energy are not significantly different from those of the gasoline engine. However, the processes of fuel supply and fuel combustion are performed differently in the diesel and gasoline engines. In particular, only air is supplied during the intake stroke, and after compression to a high compression ratio of 15–22:1, resulting in an increase in temperature to roughly 500–600° C., fuel injected into the combustion chamber is ignited as a result of the high temperature generated therein (i.e., the fuel undergoes self-combustion).

Accordingly, a fuel injection system is needed in the diesel engine. Also, diesel fuel, which easily self-combusts, must be used. The fuel injection system of the diesel engine includes a fuel tank, a fuel pipe, a fuel supply pump, a fuel filter, an injection pump, a high pressure pipe, and an injection nozzle. Fuel is supplied to the injection nozzle by first passing through these elements in the order listed.

The injection pump is driven by an engine crankshaft to pressurize fuel to a high pressure and inject the fuel into the combustion chamber through the injection nozzle. The fuel is injected into the combustion chamber at a predetermined pressure and at the appropriate time. Together with the shape of the combustion chamber, injection timing, injection period, fuel injection amount, injection state (i.e., spray travel distance or penetration force), distribution state, degree of atomization, etc., these are all important factors in determining the combustion state. A governor and timer are provided in the injection pump to enable the variation of fuel injection amounts and fuel injection timing.

The fuel injection amount and fuel injection timing can be mechanically controlled or electronically controlled using a microcomputer. These parameters are now, for the most part, controlled electronically. Also, much research is being conducted to enable more precise control of fuel injection amount and timing.

Diesel engines are more often found in large vehicles such as buses and trucks. As a safety precaution, a speed limit device is typically provided to prevent the vehicle from travelling over a predetermined speed of, for example, a legal speed limit. That is, when the predetermined speed is exceeded, operation of the accelerator pedal has no effect in that the fuel supply to the engine is cut-off.

In both the vehicle equipped with the mechanical and electronic control of the fuel injection amount and fuel injection timing, it is possible to disengage such control. In the case of the diesel engine that is electronically controlled, it is possible to remove or disconnect the vehicle speed sensor, thereby disenabling fuel injection amount and timing control. However, when the vehicle speed sensor is removed or disconnected, various other electronic controls are also disabled, such as the automatic cruise control.

SUMMARY OF THE INVENTION

The present invention has been made in an effort to solve the above problems.

It is an object of the present invention to provide a control method for a diesel engine in which the vehicle speed limit is automatically increased to a specific level to enable an increase in speed by the operation of the accelerator pedal.

To achieve the above object, the present invention provides a method for controlling a diesel engine comprising the steps of determining if a vehicle is travelling on a downgrade; outputting a predetermined fuel supply cut-off signal when the vehicle is travelling on a downgrade; determining an error between a vehicle speed limit and a present vehicle speed; setting an aiming speed as a first predetermined value; determining an aiming error; determining if the aiming error is greater than 0; setting an enable vehicle speed as a second predetermined value when the aiming error is greater than 0; setting the enable vehicle speed to 0 when the aiming error is less than 0; subtracting the error between the vehicle speed limit and the present vehicle speed from the enable vehicle speed to thereby derive an enable error; determining if the enable error is greater than 0; setting an offset vehicle speed Off_set as a third predetermined value when the enable error is greater than 0; setting the offset vehicle speed to 0 when the enable error is not greater than 0; determining if an accelerator pedal position has reached or is greater than a fourth predetermined value; adding the offset vehicle speed to the vehicle speed limit to thereby obtain a new vehicle speed limit when the accelerator position has reached the fourth predetermined value; determining if the present vehicle speed is less than the new vehicle speed limit; outputting a fuel supply control signal when the present vehicle speed is less than the new vehicle speed limit; and outputting a fuel supply cut-off control signal when the present vehicle speed is greater than the new vehicle speed limit.

According to a feature of the present invention, it is determined if the vehicle is travelling on a downgrade when the vehicle speed exceeds the vehicle speed limit for over a predetermined duration of time.

According to another feature of the present invention, the first and second predetermined values are stored in a pre-installed program and are respectively 6 kph and 4 kph.

According to still another feature of the present invention, when the enable error is greater than 0, it is determined that the vehicle has reached the end of the downgrade.

According to still yet another feature of the present invention, the third predetermined value is stored in a pre-installed program and is 20 kph.

According to still yet another feature of the present invention, the fourth predetermined value is 50%.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
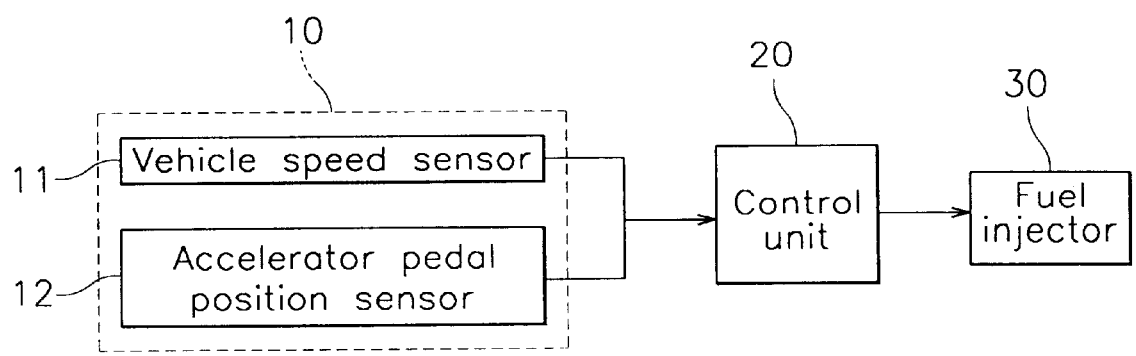
FIG. 1 is a block diagram of a diesel engine control system to which the present invention is applied.

FIG. 1 shows a block diagram of a diesel engine control system to which the present invention is applied.

The diesel engine control system comprises a detection unit 10 including a vehicle speed sensor 11 for detecting vehicle speed and an accelerator pedal position sensor 12 for detecting a position of an accelerator pedal; a control unit 20 for controlling fuel supply; and a fuel injector 30 operated according to signals output by the control unit 20 to supply fuel and cut off the supply of the same.

The control unit 20 receives signals output by the detection unit 10 to determine vehicle speed and accelerator pedal position, and compares the vehicle speed with a predetermined vehicle speed limit. When the vehicle speed exceeds the vehicle speed limit, the control unit 20 outputs a fuel supply cut-off signal. Using the detected vehicle speed, the control unit 20 also determines if the vehicle is travelling on a downgrade, as well as when an end of the downgrade has been reached. When the vehicle is travelling on a downgrade, an offset vehicle speed is established and it is determined if the position of the accelerator pedal has reached or exceeded a third predetermined value. When the position of the accelerator pedal is at or exceeds the third predetermined value, the offset vehicle speed is added to the predetermined vehicle speed limit to generate a new vehicle speed limit. Next, the control unit 20 determines if the detected vehicle speed is less than the new vehicle speed limit. When the detected vehicle speed is less than the new vehicle speed limit, the control unit 20 outputs a fuel supply control signal, and when the detected vehicle speed is greater than the new vehicle speed limit, the control unit 20 outputs a fuel supply cut-off control signal.

Figure 2:
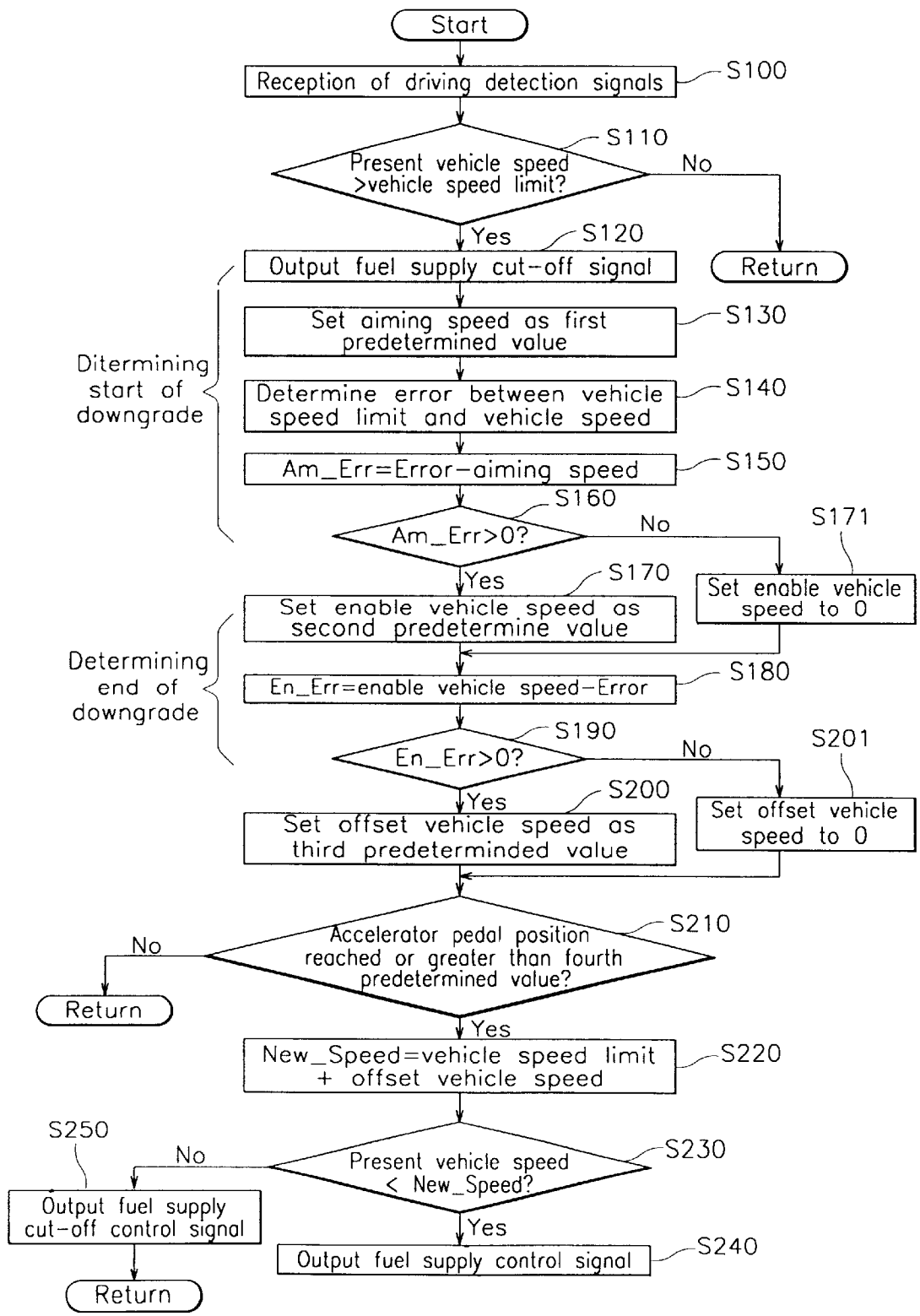
FIG. 2 is a flow chart of a control method for a diesel engine according to a preferred embodiment of the present invention.

FIG. 2 shows a flow chart of a control method for a diesel engine according to a preferred embodiment of the present invention.

The control unit 20, which performs control of the diesel engine using a pre-installed program, receives driving detection signals from the detection unit 10 in step S100. That is, the vehicle speed sensor 11 and the accelerator pedal position sensor 12 detect vehicle speed and accelerator pedal position, respectively, then outputs corresponding detection signals to the control unit 20.

Figure 3:
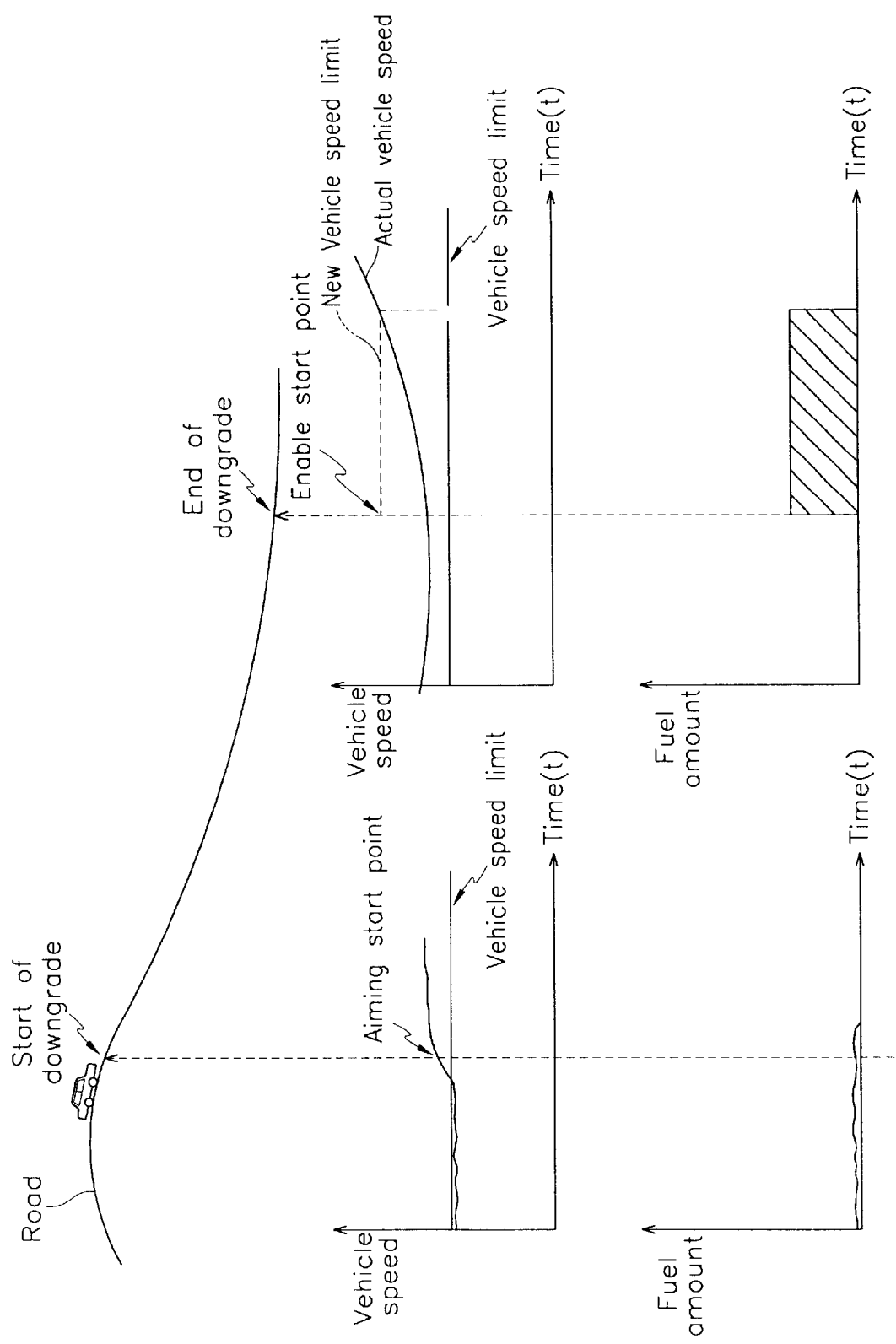
FIG. 3 shows various graphs of vehicle speed and fuel supply in relation to time as a vehicle travels on a downgrade.

The control unit 20 receives and reads the detection values of vehicle speed and acceleration pedal position from the detection unit 10, then determines if the vehicle speed exceeds a vehicle speed limit stored in a memory of the pre-installed program in step S110. When the vehicle speed exceeds the vehicle speed limit, the control unit 20 determines that the vehicle is travelling on a downgrade (see FIG. 3), after which the control unit 20 outputs a predetermined fuel supply cut-off signal to the fuel injector 30 in step S120. The fuel injector 30 is driven by the fuel supply cut-off signal output by the control unit 20 to thereby discontinue the supply of fuel to the engine.

Next, the control unit 20 subtracts the vehicle speed limit from the presently detected vehicle speed and determines an error between the vehicle speed limit and the vehicle speed in step S130. The control unit 20 then sets an aiming speed as a first predetermined value (e.g., 6 kph) stored in the memory of the pre-installed program in step S140.

After step S140, the control unit 20 subtracts the aiming speed from the error between the vehicle speed limit and the vehicle speed to derive an aiming error Am_Err in step S150. The control unit 20 then determines if the aiming error Am_Err is greater than 0 in step S160.

When the aiming error Am_Err is greater than 0, the control unit 20 sets an enable vehicle speed as a second predetermined value (e.g., 4 kph) stored in the memory of the pre-installed program in step S170. However, when the aiming error Am_Err is less than 0, the control unit 20 sets the enable vehicle speed to 0 in step S171. After either step S170 or S171, the control unit 20 subtracts the error between the vehicle speed limit and the present vehicle speed from the enable vehicle speed to thereby derive an enable error En_Err in step S180.

Subsequently, the control unit 20 determines if the enable error En_Err is greater than 0 in step S190. When the enable error En_Err is greater than 0, the control unit 20 sets an offset vehicle speed Off_set as a third predetermined value (e.g., 20 kph) stored in the memory of the pre-installed program in step S200. At this time, it is determined that the vehicle has reached the end of the downgrade.

However, when the enable error En_Err is not greater than 0 in step S190, the control unit 20 determines that the vehicle is still on the downgrade such that the offset vehicle speed Off_set is set to 0 in step S201. Either after step S200 or S201, the control unit 20 determines if the accelerator pedal position has reached or is greater than, by operation of the driver, a fourth predetermined value in step S210. When the accelerator pedal position is less than the fourth predetermined value, the control process is ended.

When the accelerator position has reached the fourth predetermined value, the control unit 20 adds the offset vehicle speed Off_set to the vehicle speed limit stored in the pre-installed program to thereby obtain a new vehicle speed limit New_Speed in step S220. The control unit 20 then determines if the present vehicle speed is less than the new vehicle speed limit New_Speed in step S230.

When the present vehicle speed is less than the new vehicle speed limit New_Speed, the control unit 20 outputs a fuel supply control signal to the fuel injector 30 such that the vehicle increases to a speed corresponding to the position of the accelerator pedal operated by the driver in step S240. However, when the present vehicle speed is greater than the new vehicle speed limit New_Speed, the control unit 20 outputs a fuel supply cut-off control signal to the fuel injector 30 in step S250. The fuel injector 30 acts accordingly.

In the control method of the present invention as described above, after determining when the vehicle is driving on a downgrade, the vehicle speed limit is increased to a specific level to enable an increase in speed by the operation of the accelerator pedal. Accordingly, the momentum of a downgrade can be used.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for controlling a diesel engine comprising the steps of:

determining if a vehicle is traveling on a downgrade;

calculating an aiming error when the vehicle is traveling on said downgrade;

setting an enable vehicle speed according to the determined aiming error;

calculating an enable error by subtracting the error between a vehicle speed limit and a present vehicle speed from the enable vehicle speed;

setting an offset vehicle speed according to the calculated enable error;

determining if an accelerator pedal position is varied above a predetermined value;

adding the offset vehicle speed to the vehicle speed limit to thereby obtain a new vehicle speed limit when the accelerator position is varied above the predetermined value; and outputting a fuel supply signal according to the new vehicle speed limit.

2. The method of claim 1 wherein it is determined if the vehicle is traveling on said downgrade when the vehicle speed exceeds the vehicle speed limit for over a predetermined duration of time.

3. The method of claim 1 further comprising, before determining said aiming error, the steps of outputting a predetermined fuel supply cut-off signal when the vehicle is traveling on said downgrade;

determining an error between said vehicle speed limit and said present vehicle speed; and setting an aiming speed as a first predetermined value.

4. The method of claim 3 wherein the first predetermined value is stored in a pre-installed program and is 6 kph.

5. The method of claim 1 wherein when the aiming error is less than 0, the enable vehicle speed is set to 0, and when the aiming error is greater than 0, the enable vehicle speed is set as a second predetermined value.

6. The method of claim 5 wherein the second predetermined value is stored in a pre-installed program and is 4 kph.

7. The method of claim 1 wherein when the enable error is greater than 0, the offset vehicle speed is set as a third predetermined value and when less than 0, the offset vehicle speed is set to 0.

8. The method of claim 7 wherein the third predetermined value is stored in a pre-installed program and is 20 kph.

9. The method of claim 1 wherein when the enable error is greater than 0, it is determined that the vehicle has reached the end of the downgrade.

10. The method of claim 1 wherein when the present vehicle speed is greater than the new vehicle speed limit, a fuel supply cut-off control signal is output, and when the present vehicle speed is less than the new vehicle speed limit, a fuel supply control signal is output.

11. The method of claim 1 wherein the predetermined value is 50%.

* * * * *